United States Patent
Goyal et al.

(10) Patent No.: US 9,483,341 B2
(45) Date of Patent: Nov. 1, 2016

(54) APPLYING SECURITY LABEL ON KERNEL CORE CRASH FILE

(71) Applicant: Red Hat, Inc., Raleigh, NC (US)

(72) Inventors: Vivek Goyal, Bedford, MA (US); RuiRui Yang, Beijing (CN)

(73) Assignee: Red Hat, Inc., Raleigh, NC (US)

( * ) Notice: Subject to any disclaimer, the term of this patent is extended or adjusted under 35 U.S.C. 154(b) by 218 days.

(21) Appl. No.: 14/146,102

(22) Filed: Jan. 2, 2014

(65) Prior Publication Data

US 2015/0186203 A1 Jul. 2, 2015

(51) Int. Cl.
G06F 11/22 (2006.01)
G06F 11/07 (2006.01)
G06F 21/57 (2013.01)

(52) U.S. Cl.
CPC ....... G06F 11/0778 (2013.01); G06F 11/0706 (2013.01); G06F 21/57 (2013.01)

(58) Field of Classification Search
USPC .................................................. 714/20, 6.1
See application file for complete search history.

(56) References Cited

U.S. PATENT DOCUMENTS

| | | | |
|---|---|---|---|
| 7,240,240 B2* | 7/2007 | Balakrishnan et al. ........ | 714/15 |
| 8,010,848 B2 | 8/2011 | Cassell et al. | |
| 2010/0319001 A1* | 12/2010 | Jones ............................ | 718/108 |
| 2010/0333193 A1* | 12/2010 | Goding et al. .................. | 726/16 |
| 2011/0138174 A1* | 6/2011 | Aciicmez et al. ............ | 713/165 |
| 2011/0296487 A1* | 12/2011 | Walsh ............................ | 726/1 |
| 2012/0066272 A1* | 3/2012 | Drepper ........................ | 707/822 |
| 2012/0131380 A1* | 5/2012 | Horman et al. ............... | 714/6.1 |
| 2013/0290789 A1* | 10/2013 | Wen ............................. | 714/37 |
| 2013/0332981 A1* | 12/2013 | Paris et al. ........................ | 726/1 |
| 2014/0040671 A1* | 2/2014 | Akirav et al. .................. | 714/45 |
| 2014/0075495 A1* | 3/2014 | Paris et al. ........................ | 726/1 |
| 2014/0310798 A1* | 10/2014 | Turean et al. .................. | 726/16 |
| 2015/0149830 A1* | 5/2015 | Escobar Olmos et al. ......................... | 714/38.11 |

OTHER PUBLICATIONS

Fedora Manpages, "Security Enhanced Linux Policy for the Kdump Processes," 2 pages, http://linuxmanpages.net/manpages/fedora17/man8/kdump_selinux.8.html, [retrieved on Jan. 9, 2014].

Stelian Pop, "Dump/Restore Ext2/3/4 Filesystem Backup," 2005, 23 pages, http://sourceforge.net/mailarchive/forum.php?set=custom&viewmonth=&viewday=&forum_name=dump-announce&style=nested&max_rows=25&submit=Change+View , [retrieved on Jan. 9, 2014].

"Configuring Kdump on the Command Line," Red Hat, Inc., 3 pages, https://access.redhat.com/site/documentation/en-US/Red_Hat_Enterprise_Linux/6/html/Deployment_Guide/s2-kdump-configuration-cli.html, [retrieved on Jan. 9, 2014].

(Continued)

Primary Examiner — Kamini Patel
(74) Attorney, Agent, or Firm — Lowenstein Sandler LLP

(57) ABSTRACT

A system for applying security label on a kernel core crash file is disclosed. A method of the disclosure includes accessing, by a processing device, a crash recovery configuration file, parsing the crash recovery configuration file to determine a storage location of a core file, the core file comprising an image of a kernel of an operating system (OS), the image being captured when the OS fails, locating the core file at the determined storage location, and upon determining that a security label is not associated with the core file, sending a command to apply the security label to the core file.

20 Claims, 4 Drawing Sheets

(56) References Cited

OTHER PUBLICATIONS

Huang et al, "Optimizing Crash Dump in Virtualized Environments," Parallel Processing Institute; Fudan University, Mar. 17-19, 2010, 12 pages, http://citeseerx.ist.psu.edu/viewdoc/download?doi=10.1.1.167.3724&rep=rep1&type=pdf , [retrieved on Jan. 9, 2014].

Christensen, et al., "Umbrella We can't prevent the rain . . . - But we don't get wet!," Aalborg University, Jun. 2004, 127 pages, http://projekter.aau.dk/projekter/files/61060987/1086191249.pdf [retrieved on Jan. 9, 2014].

* cited by examiner

APPLYING SECURITY LABEL ON KERNEL CORE CRASH FILE

TECHNICAL FIELD

Aspects of the disclosure relate generally to operating systems and, more specifically, relate to applying security label on kernel core crash file.

BACKGROUND

Many operating systems include advanced crash dumping mechanisms. When the crash dumping mechanism is enabled, the system is booted from the context of another kernel than the main operating kernel. This second kernel reserves a small amount of memory and its purpose is to capture crash data, such as a core dump image (e.g., core file) of the kernel when the system crashes. The ability to analyze the core file significantly helps to determine the exact cause of system failure.

Many current operating systems (OSes) implement a security labeling feature, such as Mandatory Access Control (MAC) labeling of SELinux™. However, when creating and saving the core file upon a system crash, a problem may arise with the security labeling of the core file. For example, when the core file is captured, a root file system might not be mounted for use by the second kernel and, as a result, the core file may be saved to a disk that is not the root disk. Accordingly, this results in the OS security labeling policy not being available at the time of saving the core file and not being able to apply the security label on core file at the time of system crash. This can potentially be a security issue as the core file will be unlabeled when system boots back in the main operating kernel.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provide for applying security label on a kernel core crash file. When an operating system (OS) kernel crashes, a crash recovery component executed in a dedicated crash kernel of the system may collect an image of the kernel that crashed for use in analysis and debugging. This image may be referred to as the kernel core crash file, or as a "core file". Once the core file has been collected and the OS re-started, embodiments of the disclosure apply the security label to the core file. The crash recovery component may access a configuration file for the crash recovery, parse this configuration file to determine a location of the core file, and access the core file at the determined location to assess whether a security label is already applied to the core file. When a security label is not present with the core file, embodiments send a command to a security labeling feature of the OS to generate and apply the security label to the core file.

Conventional solutions for security labeling of core files included different options for ensuring security labels were applied to core files from a crash recovery process. One solution included applying the security label when the core file was initially captured. However, this solution typically only works when the core file is saved to a root file system. Otherwise, when the root file system is not mounted, the security labeling policy is usually not available and cannot be accessed for accurate labeling purposes.

Another solution is to save a security labeling policy in the crash kernel space for use by the crash recovery process in collecting the core file post-crash. However, this solution generally suffers from the drawback that if an administrator has updated or changed the security labeling policy since it was saved to the crash kernel space, the security labeling policy is usually no longer accurate or reliable. Another disadvantage to this solution is that it utilizes additional memory for the crash recovery process. This memory space is not utilized by the first operating kernel for general OS operations and, as such, remains unused for a majority of time, which is inefficient.

Embodiments of the disclosure overcome the disadvantages presented by the prior solutions. The security labeling of embodiments is persistently available and accurate as it relies on the OS security labeling policy that is current and up-to-date in the operating OS. It also saves memory in the crash kernel space by avoiding having to save the security labeling policy in the crash kernel space.

Figure 1:
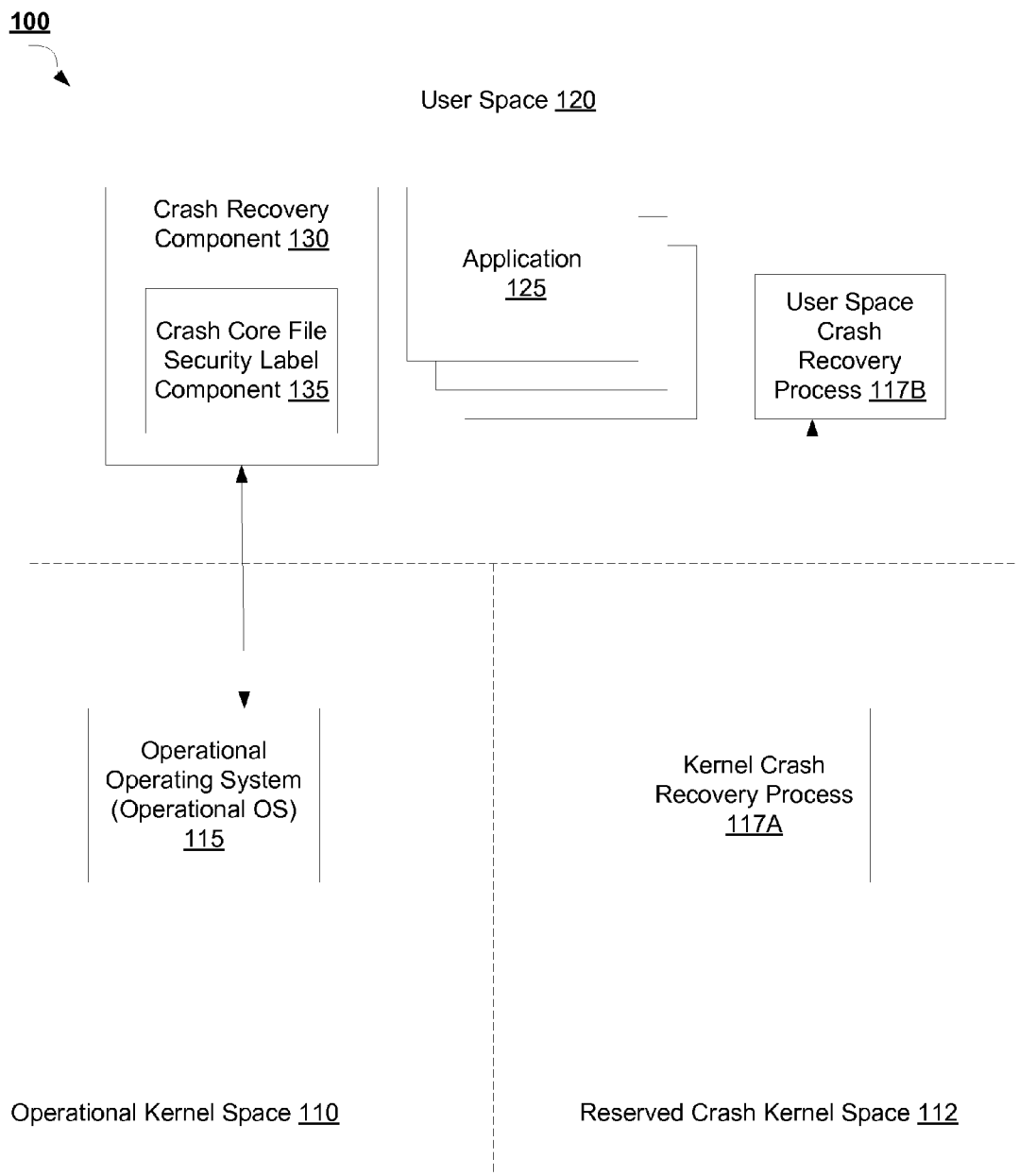
FIG. 1 is a block diagram of one embodiments of a system for applying a security label on a kernel core crash file.

FIG. 1 is a block diagram of one embodiment of a system 100 that may be part of a computing system such as a client computer (e.g., a personal computer, a laptop, a Personal Digital Assistant (PDA), a mobile phone, a tablet device, etc.), a server computer, a gateway computer, and so on. An exemplary computer system is described in greater detail below in conjunction with FIG. 4. System 100 includes physical memory (e.g., main memory), that is mapped to virtual memory, which can be divided into regions, such as user space 120 and operational kernel space 110. User space 120 is reserved for user mode programs including applications 125. The operational kernel space 110 is memory space for running an operating system (OS) 115 (e.g., Linux™ OS, SELinux™ OS, Windows™ OS, etc.). OS 115 acts as an interface between an application 125 and the computing system hardware (not shown) of system 100. OS 115 is responsible for providing services within system 100, such as the initial loading of applications 125, file management, and protection facilities. For example, upon a bootup procedure of system 100, OS 115 can execute an initialization program/process (init process).

Operational kernel space 110 can also be referred to as a first kernel space. OS 115 can provide a crash recovery component 130. In one embodiment, crash recovery component 130 is a kdump service in Red Hat Enterprise Linux™ OS. The crash recovery component 130 provides a second kernel (crash kernel) using a protected region of memory known as the reserved crash kernel space 112. In some embodiments, the second kernel may also be referred to as a capture kernel. Because the booting (initial set of operations used to initialize a component) of the crash kernel utilizes a set amount of memory space, the operational kernel (also referred to as the 'first kernel' and/or the 'first operational kernel') sets aside (reserves) this memory 112 for the crash kernel. The reserved crash kernel space 112 is protected from general user (i.e., is not available during normal operation of the operational OS 115A in the operational kernel space 110. The crash recovery component 130 also configures and provides a disk image including one or more crash recovery utilities that are utilized by the crash kernel when the crash kernel is booted into upon a crash of the first kernel.

When the OS 115 in the operational kernel space 110 experiences a system failure, the first kernel jumps to the crash kernel to boot into. Once booted, the crash kernel starts a kernel space crash recovery process 117A that can reinitialize the hardware of system 100 without modifying the state of the crashed OS 115 memory. The crash recovery process 117A also starts a user space crash recovery process 117B that can collect state data of the crashed OS 115 for post-mortem analysis. The state data may include a core dump image file (also referred to as 'core file' or a 'kernel core crash file') that captures an image of the kernel memory upon the crash event. Once the crash recovery process 117A, 117B has executed and saved the core file, the OS 115 is re-booted into operational kernel space 110 to resume providing general operating services for system 100.

When OS 115 implements a security labeling feature, such as Mandatory Access Control (MAC) labeling of SELinux™, labeling of the core file collected by the crash recovery process 117 can be problematic. For example, when the core file is captured, a root file system might not be mounted for use by the second kernel and, as a result, the core file may be saved to a disk that is not the root disk. Accordingly, this results in a security labeling policy of the OS 115 not being available at the time of saving the core file and, as such, a security label cannot be applied to the core file at the time of the system 100 crash. This can potentially be a security issue as the core file will be unlabeled when the system 100 boots back in the main operating kernel 110.

Embodiments of the disclosure provide a crash core file security label component 135 of crash recovery component 130 to apply a security label to the core file after the OS 115 has been re-booted. The OA 115 is re-booted subsequent to crash recovery process 117A, 117B performing the crash recovery, including saving the core file, for the crashed OS 115. At the time of collection of the core file, it is not labeled with a security label. Once the OS 115 initializes, the root file system is mounted and the policy data related to the security labeling feature is available. At this time, the crash file security label component 135 can determine that the core file should be labeled and cause such labeling to occur via a security labeling feature of the OS 115. One embodiment of a crash core file security label component 135 is described in greater detail below with respect to FIG. 2.

Figure 2:
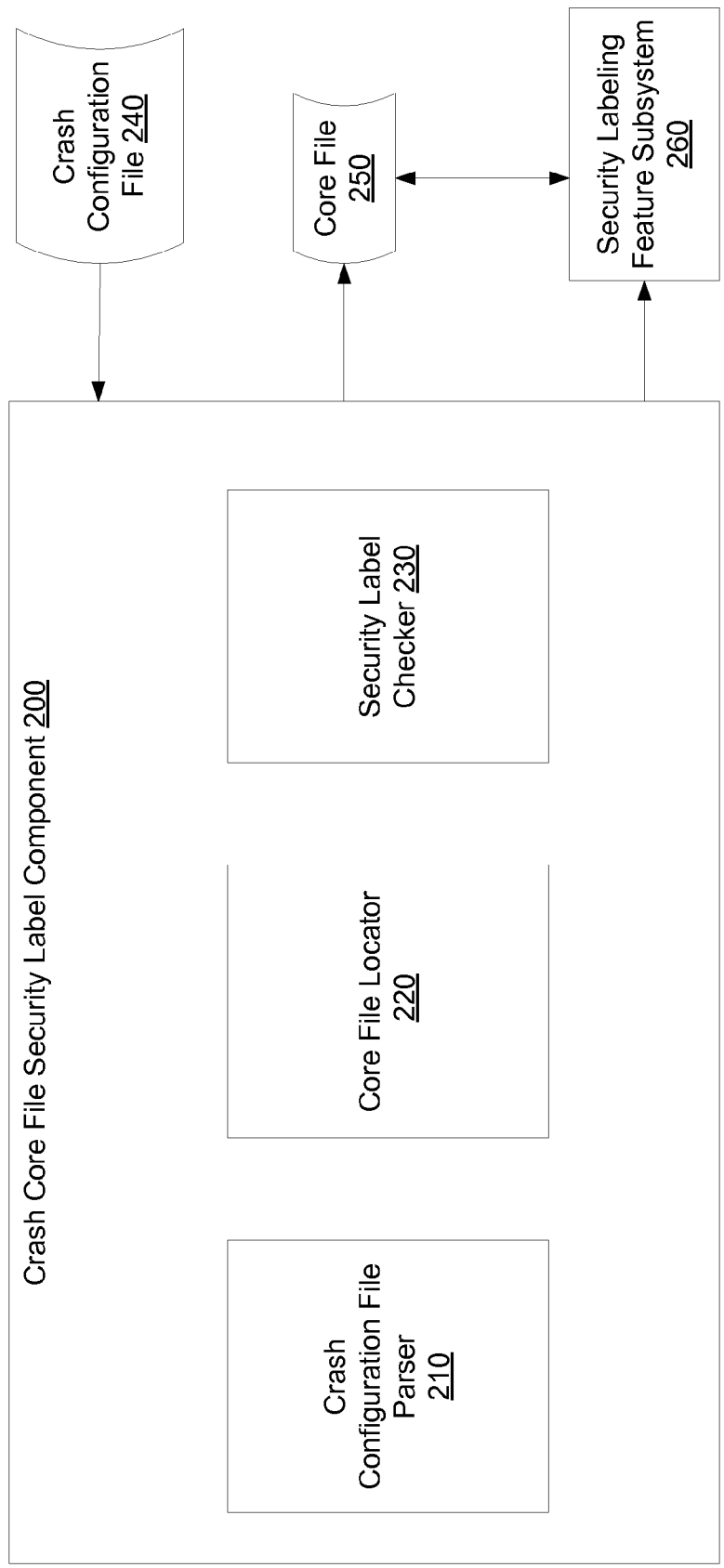
FIG. 2 is a block diagram of one embodiment of a crash core file security label component for applying security labels to core files generated from a system crash.

FIG. 2 is a block diagram of one embodiment of a crash core file security label component 200 for applying security labels to core files generated from a system crash. The crash core file security label component 200 may be part of a crash recovery component, such as crash recovery component 130 of FIG. 1, which resides in user space and may by the same as crash core file security label component 135 of FIG. 1.

The crash core file security label component 200 can include a crash configuration file parser 210, a core file locator 220, and a security label checker 230. When an operational OS implementing a security labeling feature, such as operational OS 115A of FIG. 1, initializes, the crash core file security label component 200 executes as part of the initialization routine.

As part of the crash core file security label component 200 routine, the crash configuration file parser 210 obtains and parses a crash configuration file 240. The crash configuration file 240 may be a settings file of a crash recovery component of the OS that includes various parameters controlling a crash dump routine of the OS. For example, parameters in the crash configuration file 240 may include a location of reserved crash kernel space, a size of the reserved crash kernel space, an image file of the crash recovery process, a storage location of a the collected core file, a file system type of the core file storage location, an identifier (ID) or other label of a disk location of the core file store location, and so on. The crash configuration file parser 210 may examine and identify the different parameters in the core configuration file to determine the location of the core file 250 saved by a crash recovery process.

Once the crash configuration file parser 210 determines the location of the core file 250, the core file locator navigates to the destination in the system and locates the core file 250. Then, security label checker 230 determines whether a security label is already associated with the core file 250. In one embodiment, if the security label checker 230 determines that there is not a security label associated with the core file 250, then the security label checker 230 issues a command to security labeling feature subsystem 260 to generate a label for the core file 250 and apply this generated label to the core file 250. The security labeling feature subsystem 260 may utilize a combination of both user space utilities and OS kernel functionality to provide security labeling feature for an OS. The security labeling feature subsystem 260 may utilize an existing security labeling policy of the OS to determine the appropriate rules to apply to the core file 250 in order to generate and apply the label to the core file 250.

In one embodiment, if a security label is already associated with the core file 250, then crash file security label component 200 ends its routine without further action. However, in other embodiments, the crash file security label component 200 may perform further analysis with respect to the existing core file 250 label, such as determining if the label is the correct security label for the core file 250 (e.g., in cooperation with the OS security labeling feature subsystem 260).

Figure 3:
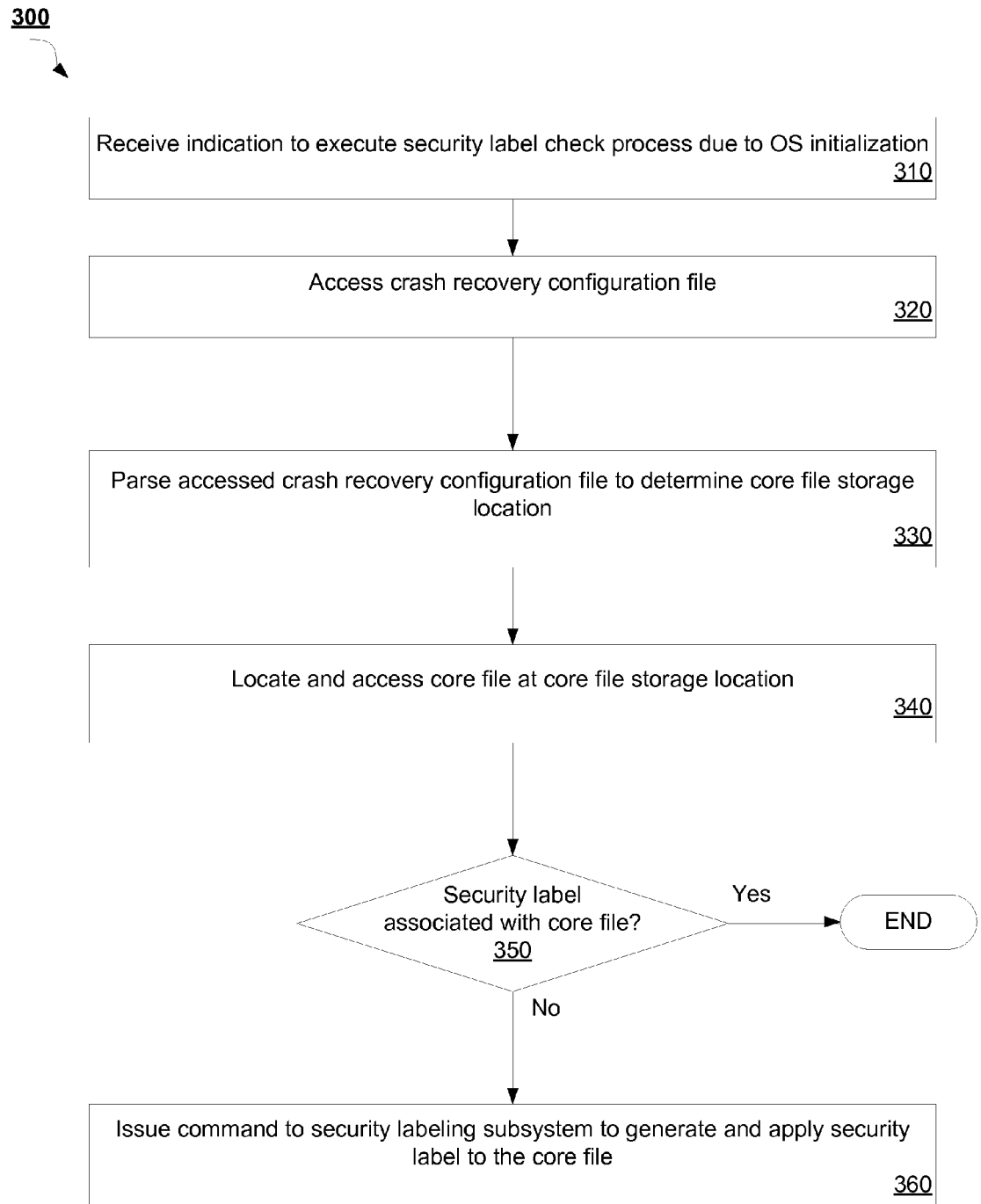
FIG. 3 is a flow diagram illustrating a method for applying a security label on a kernel core crash file, according to embodiments of the disclosure.

FIG. 3 is a flow diagram illustrating a method 300 for applying security label on kernel core files according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by crash core file security label component 200 of FIG. 2.

Method 300 begins at block 310 where an indication to execute a security label check process is received. In one embodiment, the indication is provided to the crash core file security label component in response to an OS of the system initializing. At block 320, a crash recovery configuration file is accessed. The crash configuration file may be a settings file of a crash recovery component of the OS that includes various parameters controlling a crash dump routine of the OS. For example, parameters in the crash configuration file 240 may include a location of reserved crash kernel space, a size of the reserved crash kernel space, an image file of the crash recovery process, a storage location of a the collected core file, a file system type of the core file storage location, an identifier (ID) or other label of a disk location of the core file store location, and so on.

Then, at block 330, the accessed crash recovery configuration file is parsed to determine a core file storage location. The core file storage location may be specified in the crash recovery configuration file, or a general file system location of the core file may be specified in the crash recovery configuration file. At block 340, the core file is located and accessed at the core file storage location as determined in block 330.

At decision block 350, it is determined whether a security label is associated with the core file. If so, then method 300 ends. If not, then method 300 continues to block 360, where a command is issued to a security labeling subsystem to generate and apply a security label to the core file. The security labeling feature subsystem may utilize existing security labeling policy of the OS to determine the appropriate rules to apply to the core file in order to generate and apply the label to the core file.

Figure 4:
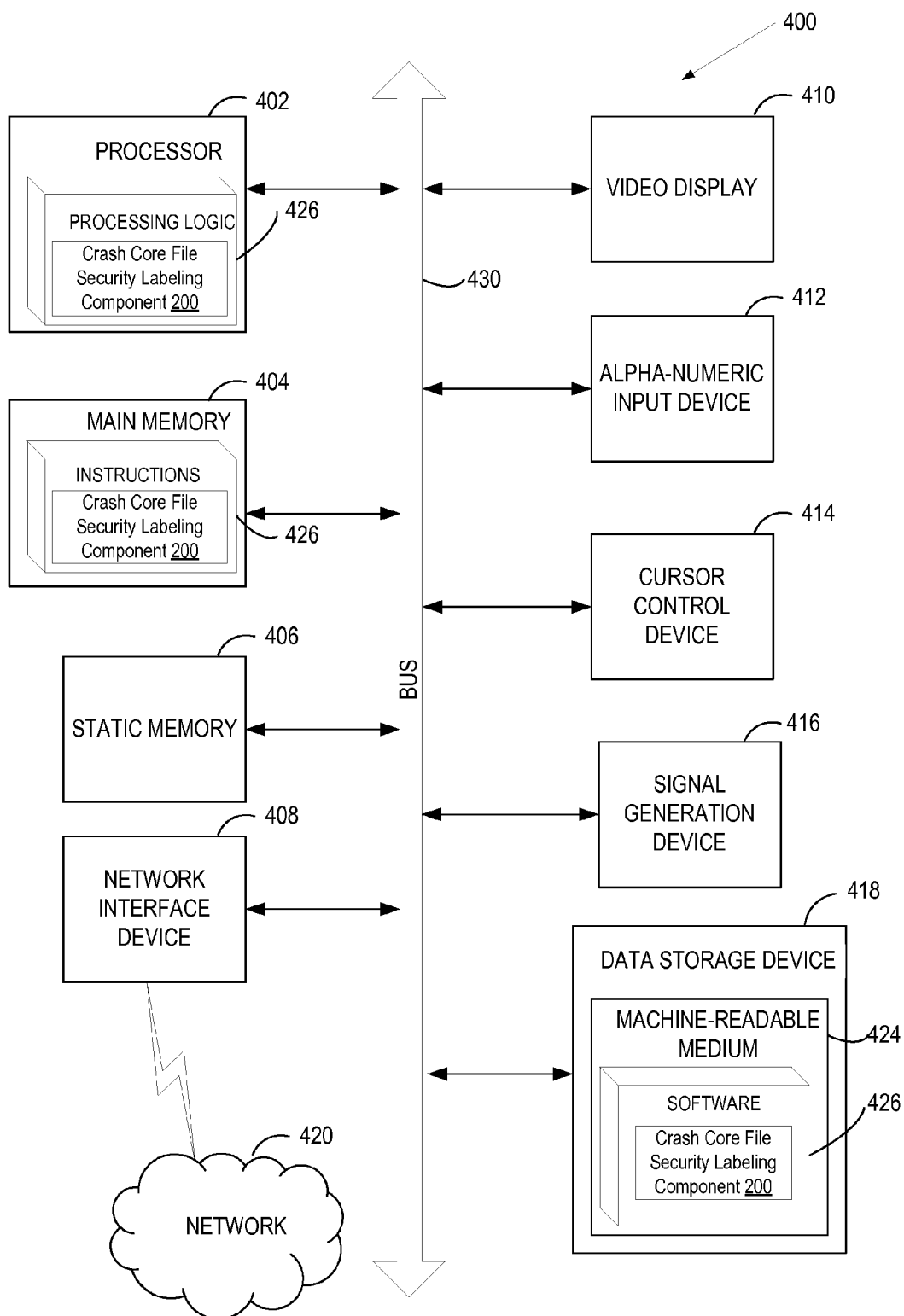
FIG. 4 illustrates a block diagram of one embodiment of a computer system.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 400 includes a processing device 402, a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408 communicably coupled to a network 420. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 424 on which is stored software 426 embodying any one or more of the methodologies of functions described herein. The software 426 may also reside, completely or at least partially, within the main memory 404 as instructions 426 and/or within the processing device 402 as processing logic 426 during execution thereof by the computer system 400; the main memory 404 and the processing device 402 also constituting machine-accessible storage media.

The machine-readable storage medium 424 may also be used to store instructions 426 to implement a crash core file security labeling component 200 to perform applying security label on kernel core files in a computer system, such as crash core file security labeling component 200 described with respect to FIG. 2, and/or a software library containing methods that call the above applications. While the machine-accessible storage medium 428 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "accessing", "parsing", "locating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method, comprising:
    executing, by a processing device, a crash recovery process in a crash kernel space upon failure of an operating system (OS) corresponding to operational kernel space on a system of the processing device;
    in response to completion of the crash recovery process, resuming operation of the OS in the operational kernel space of the system;
    accessing, by the processing device, a crash recovery configuration file associated with the failure of the OS, the crash recovery configuration file comprising parameters for the crash recovery process;
    parsing the crash recovery configuration file to determine a storage location of a core file, the core file comprising an image of a kernel of the OS, the image being captured when the OS fails, wherein the storage location corresponds to a crash kernel space file system that is different than a root file system of the OS;
    locating the core file at the determined storage location; and
    in response to determining that a security label is not associated with the core file, sending, by the processing device, a command to apply the security label to the core file.

2. The method of claim 1, wherein the accessing occurs in response to determining that the OS is initializing.

3. The method of claim 1, wherein the crash kernel space is separate from memory space dedicated to the operational kernel space of the OS on the system of the processing device.

4. The method of claim 1, wherein the command is sent to a security labeling feature subsystem of the OS.

5. The method of claim 3, wherein the OS comprises a SELinux™ OS.

6. The method of claim 5, wherein the crash recovery component comprises a kdump service of the SELinux™ OS.

7. The method of claim 1, wherein the security label is a Mandatory Access Control (MAC) label.

8. The method of claim 1, further comprising, upon determining that the security label is associated with the core file, determining whether the security label is accurate for the core file based on a security labeling policy of the OS.

9. A system, comprising:
    a memory;
    a processing device communicably coupled to the memory, the processing device to:
        execute a crash recovery process in a crash kernel space upon failure of an operating system (OS) corresponding to operational kernel space on the system of the processing device;
        in response to completion of the crash recovery process, resume operation of the OS in the operational kernel space of the system;
        access a crash recovery configuration file associated with the failure of the OS, the crash recovery configuration file comprises parameters for the crash recovery process;
        parse the crash recovery configuration file to determine a storage location of a core file, the core file comprising an image of a kernel of the OS, the image being captured when the OS fails, wherein the storage location corresponds to a crash kernel space file system that is different than a root file system of the OS;
        locate the core file at the determined storage location; and
        in response to determining that a security label is not associated with the core file, send a command to apply the security label to the core file.

10. The system of claim 9, wherein the accessing occurs in response to determining that the OS is initializing.

11. The system of claim 9, wherein the crash kernel space separate from a portion of the memory dedicated to the operational kernel space of the OS.

12. The system of claim 9, wherein the command is sent to a security labeling feature subsystem of the OS.

13. The system of claim 12, wherein the OS comprises a SELinux™ OS, and wherein the crash recovery component comprises a kdump service of the SELinux™ OS.

14. The system of claim 9, wherein the security label is a Mandatory Access Control (MAC) label.

15. The system of claim 9, wherein the crash recovery component further to, upon determining that the security label is associated with the core file, determine whether the security label is accurate for the core file based on a security labeling policy of the OS.

16. A non-transitory machine-readable storage medium including data that, when accessed by a processing device, cause the processing device to:

resume operation of an operating system (OS) in an operational kernel space of a system comprising the processing device subsequent to completion of a crash recovery process;

access, by the processing device, a crash recovery configuration file comprising parameters for the crash recovery process;

parse the crash recovery configuration file to determine a storage location of a core file, the core file comprising an image of a kernel of an operating system (OS), the image being captured when the OS fails, wherein the storage location corresponds to a crash kernel space file system that is different than a root file system of the OS;

locate the core file at the determined storage location; and in response to determining that a security label is not associated with the core file, send, by the processing device, a command to apply the security label to the core file.

17. The non-transitory machine-readable storage medium of claim 16, wherein the crash kernel space separate from memory space dedicated to the operational kernel space of the OS on the system of the processing device.

18. The non-transitory machine-readable storage medium of claim 16, wherein the command is sent to a security labeling feature subsystem of the OS.

19. The non-transitory machine-readable storage medium of claim 16, wherein the security label is a Mandatory Access Control (MAC) label.

20. The non-transitory machine-readable storage medium of claim 16, wherein the processing device is further to, upon determining that the security label is associated with the core file, determine whether the security label is accurate for the core file based on a security labeling policy of the OS.

\* \* \* \* \*